United States Patent
Hong et al.

(10) Patent No.: US 7,632,682 B2
(45) Date of Patent: Dec. 15, 2009

(54) ANTHRAQUINONE COLORANT COMPOSITIONS AND METHODS FOR PRODUCING THE SAME

(75) Inventors: X. Michael Hong, Greer, SC (US); Robert L. Mahaffey, Spartanburg, SC (US); Eric B. Stephens, Spartanburg, SC (US); Richard A. Vandahm, Spartanburg, SC (US)

(73) Assignee: Milliken & Company, Spartanburg, SC (US)

( * ) Notice: Subject to any disclaimer, the term of this patent is extended or adjusted under 35 U.S.C. 154(b) by 740 days.

(21) Appl. No.: 11/007,453

(22) Filed: Dec. 8, 2004

(65) Prior Publication Data

US 2006/0117499 A1    Jun. 8, 2006

(51) Int. Cl.
G01N 37/00   (2006.01)

(52) U.S. Cl. ........................................................ 436/56
(58) Field of Classification Search .................... 436/56
See application file for complete search history.

(56) References Cited

U.S. PATENT DOCUMENTS

| | | | |
|---|---|---|---|
| 2,050,662 A | 8/1936 | Koeberle et al. | 260/60 |
| 2,204,749 A | 6/1940 | Coffey et al. | 260/373 |
| 2,211,943 A | 8/1940 | Wilder | 260/378 |
| 3,164,449 A | 1/1965 | Buxbaum | 44/59 |
| 3,597,254 A | 8/1971 | Graser et al. | 106/288 Q |
| 4,137,243 A | 1/1979 | Farmer | 260/378 |
| 4,284,729 A | 8/1981 | Cross et al. | 521/158 |
| 4,640,690 A | 2/1987 | Baumgartner et al. | 8/506 |
| 4,732,570 A | 3/1988 | Baumgartner et al. | 8/506 |
| 4,746,461 A | 5/1988 | Zielske | 260/370 |
| 4,812,141 A | 3/1989 | Baumgartner et al. | 8/506 |
| 4,846,846 A | 7/1989 | Rekers et al. | 8/515 |
| 5,231,135 A | 7/1993 | Machell et al. | 525/123 |
| 5,240,464 A | 8/1993 | Kluger et al. | 8/506 |
| 5,756,844 A | 5/1998 | Baxter et al. | 564/321 |
| 5,770,552 A * | 6/1998 | Bruhnke | 510/343 |
| 5,770,557 A * | 6/1998 | Bruhnke | 510/515 |
| 6,022,944 A | 2/2000 | Weaver et al. | 528/391 |
| 6,426,416 B1 | 7/2002 | Weaver et al. | 544/246 |
| 6,447,591 B1 | 9/2002 | Titterington et al. | 106/31.29 |
| 6,528,564 B1 | 3/2003 | Xia | 524/242 |
| 6,593,483 B2 | 7/2003 | Xia | 552/259 |
| 6,635,350 B2 | 10/2003 | Connor et al. | 428/411.1 |
| 6,642,283 B2 * | 11/2003 | Ragsdale et al. | 521/114 |
| 2003/0225294 A1 | 12/2003 | Feldhues et al. | 552/236 |

FOREIGN PATENT DOCUMENTS

GB          421 117        12/1934
WO     WO 02/16464 A2    2/2002

OTHER PUBLICATIONS

"The Chemistry of Synthetic Dyes (vol. V)" Edited by K. Venkataraman (1971) p. 90.
"The Chemistry of Synthetic Dyes and Pigments" Edited by H.A. Lubs (1955) p. 399.

* cited by examiner

*Primary Examiner*—Walter D Griffin
*Assistant Examiner*—Bobby Ramdhanie
(74) *Attorney, Agent, or Firm*—Brenda D Wentz

(57) ABSTRACT

This invention relates to compositions of N,N'-dialkyleneoxy-substituted 1,4-diaminoanthraquinone colorants which contain a low percentage of impurities, to a process to make the compositions, and also to the use of the compositions thus prepared for coloring consumer products.

31 Claims, 1 Drawing Sheet

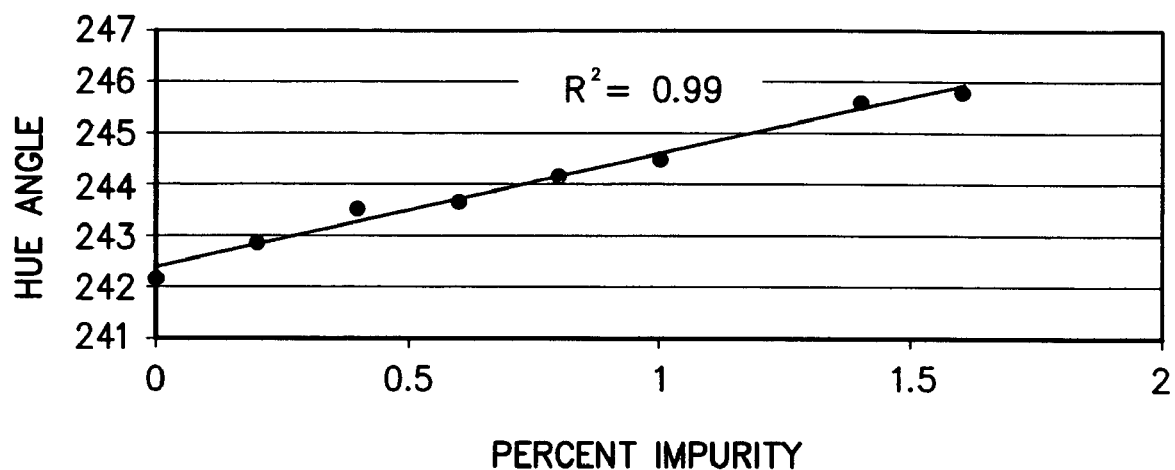
FIG. -1-

ANTHRAQUINONE COLORANT COMPOSITIONS AND METHODS FOR PRODUCING THE SAME

FIELD OF THE INVENTION

This invention relates to compositions of N,N'-dialkyleneoxy-substituted 1,4-diaminoanthraquinone colorants which contain a low percentage of impurities, to a process to make the compositions, and also to the use of the compositions thus prepared for coloring consumer products.

BACKGROUND OF THE INVENTION

Aminoanthraquinones are well known for use as dyes and coloring agents for oils, drugs, cosmetic products, waxes, and detergents. N,N'-dialkyleneoxy-substituted 1,4-diaminoanthraquinones are usually blue in shade, generally more brilliant than many other blue chromophores, and have good desirable stability properties, especially toward high alkaline environments, heat, and light. This invention relates to a colorant containing compounds having general formula (I):

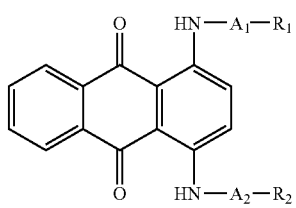

wherein $A_1$ and $A_2$ are, independently of each other, polyethyleneoxy-, polypropyleneoxy-, or polyethyleneoxy-/polypropyleneoxy-copolymers;

wherein the number of repeating polyethyleneoxy-, and/or polypropyleneoxy- units is less than or equal to 25; or wherein $A_1$ and $A_2$ are, independently of each other, $-CH_2CH_2CH_2M[(CH_2CH_2O)_x]_y-$;

wherein M can be either O or N and x=1-5, and if M is O, then y=1 and if M is N then y=2; and wherein $R_1$ and $R_2$ represent the terminal group of the polyalkyleneoxy chain and are, independently of each other, selected from the group consisting of OH, $NH_2$, and $C_1$-$C_8$ alkoxy groups.

The colorant of the present invention contains very low levels of impurities, which are generated during the process to make the colorant. One impurity present in an amount that is less than about 1.0% by weight is a violet impurity. This impurity is represented by general formula (II):

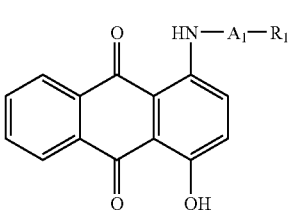

wherein $A_1$ and $R_1$ are as defined above in general formula (I).

Yet another impurity present in the colorant composition in an amount that is less than about 1.0% by weight is a water and methanol insoluble black material.

N,N'-dialiphatic-substituted 1,4-diaminoanthraquinone colorants are generally synthesized from 1,4-dihydroxyanthraquinone (i.e. quinizarin) or 2,3-dihydro-9,10-dihydroxy-1,4-anthracenedione (i.e. leucoquinizarin) or a mixture of these two compounds with suitable amines. For example, U.S. Pat. No. 5,756,844 to Baxter et al. discloses a process for producing an aminoanthraquinone dye concentrate wherein quinizarin and/or its leuco derivative is allowed to react with a mixture of three or more aliphatic amines, and wherein the reaction is carried out in the presence of an organic solvent such as glycol and/or a glycol ether (like dipropylene glycol monomethyl ether). U.S. Pat. No. 6,447,591 to Titterington et al. discloses a process for preparing waxy substituted anthraquinone compounds from a mixture of leucoquinizarin and quinizarin. U.S. Pat. No. 3,164,449 to Buxbaum and U.S. Pat. No. 3,597,254 to Graser et al. disclose 1,4-dialkylamino-substituted anthraquinone colorants and mixtures as gasoline colorants.

There are several disadvantages to making anthraquinone colorants according to these methods. For example, several of these patents disclose that organic solvents and catalysts may be utilized for the preparation of colorants. The use of organic solvents, which are generally expensive and not environmentally friendly, usually results in the need for purification of the colorant after synthesis in order to remove the solvents. Additionally, most of the anthraquinone colorants mentioned in these patents are relatively low molecular weight molecules, and they are generally solids at room temperature. Thus, the majority of the dyes disclosed in these patents are not water soluble at room temperature, are not water miscible at ambient conditions, and are not water fugitive (i.e. non-staining).

Other reaction routes also can be used to make the N,N'-dialkyleneoxy-substituted 1,4-diaminoanthraquinone colorants described in the present invention. For example, 1,4-dihaloanthraquinone compounds may be treated with suitable amines and catalysts (such as, for example, copper chloride) to make 1,4-dialiphatic aminoanthraquinone colorants, as described in German Patent No. 125,698. The 1,4-disubstituted aminoanthraquinone compounds may also be made from 1,4-diaminoanthraquinones by reacting with organic halides, as described in German Patent No. 172,464. Additionally, 1,4-ditosyloxy anthraquinone may be used to make both symmetrical and asymmetrical 1,4-diaminoanthraquinone colorants, as described in U.S. Pat. No. 4,746,461 to Zielske. However, many of the raw materials necessary for these processes are generally not readily available. Additionally, many of these processes are not economical and also are not environmentally friendly due to the chemical waste produced.

Other anthraquinone colorants, such as 1,4-disubstituted aliphatic aminoanthraquinones, are disclosed in U.S. Pat. No. 4,846,846 to Rekers et al. wherein anthraquinones were prepared from a mixture of quinizarin, leucoquinizarin, and amine in water followed by various purification procedures. The preferred amines are sec-alkyl primary amines with reactive groups, such as —OH, —$NH_2$, or —SH, on the end of the molecules. These anthraquinone colorants are used to color polyurethane resins, particularly foams. U.S. Pat. No. 4,137,243 to Farmer discloses polymeric anthraquinone colorants with terminal amino groups from leucoquinizarin and polymeric diamines. The leucoquinizarin can be generated in-situ by reduction of quinizarin with sodium hydrosulfite. The polymeric aminoanthraquinone colorants, prepared according to the above patent processes, also contain high levels of impurities such that further purification is needed to obtain higher purity anthraquinone colorants. Purification of low melting or liquid water-soluble anthraquinone colorants usually involves time consuming extraction and washing procedures that often require organic solvents, which generally are not environmentally friendly. Additionally, these solvents are typically not suitable for use in many consumer product applications and complete removal is required. The organic solvents are often expensive and generate additional waste during production of the anthraquinone colorants. Furthermore, some of the impurities in these anthraquinone colorants are often difficult to filter and generally cause dull color, shade shift, and staining.

Thus, there is a need for a colorant which may be used in various consumer products (such as liquid and solid laundry detergents and liquid fabric softeners) that has low levels of impurities, that is non-staining, that is made without the use of organic solvents, and that is made without the use of expensive and time-consuming purification and filtration steps. Accordingly, one object of this invention is to provide an N,N'-dialkyleneoxy-substituted 1,4-diaminoanthraquinone colorant with reduced amounts of impurities. Another object of this invention is to provide methods to make such anthraquinone colorants without the use of solvents. A further object of this invention is to use these inventive colorants for coloration of consumer products, such as liquid and solid laundry detergents and liquid fabric softeners.

BRIEF DESCRIPTION OF THE DRAWINGS

FIG. 1 is a line graph showing effect of violet impurity on hue angle.

DESCRIPTION OF THE INVENTION

All U.S. and foreign patents and U.S. patent applications disclosed in this specification are hereby incorporated by reference in their entirety.

The term "polyalkyleneoxy," as used herein, generally refers to molecular structures containing the following repeating units: —$CH_2CH_2O$—, —$CH_2CH_2CH_2O$—, —$CH_2CH_2CH_2CH_2O$—, —$CH_2CH(CH_3)O$—, —$CH_2CH_2CH(CH_3)O$—, and any combinations thereof.

The term "anthraquinone," as used herein, generally refers to the following general chemical structure and numbering sequence:

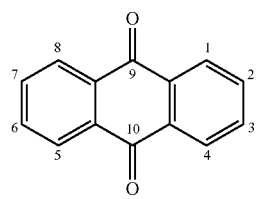

The N,N'-dialkyleneoxy-substituted 1,4-diaminoanthraquinone colorants of the present invention are represented by general formula (I):

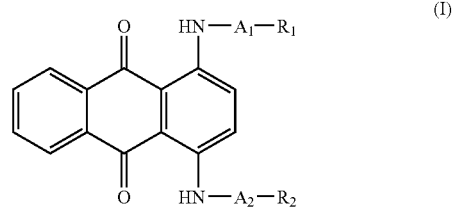

wherein $A_1$ and $A_2$ are, independently of each other, polyethyleneoxy-, polypropyleneoxy-, or polyethyleneoxy-/polypropyleneoxy-copolymers;

wherein the number of repeating polyethyleneoxy-, and/or polypropyleneoxy- units is less than or equal to 25; or wherein $A_1$ and $A_2$ are, independently of each other, —$CH_2CH_2CH_2M[(CH_2CH_2O)_x]_y$—;

wherein M can be either O or N and x=1-5, and if M is O, then y=1 and if M is N then y=2; and wherein $R_1$ and $R_2$ represent the terminal group of the polyalkyleneoxy chain and are, independently of each other, selected from the group consisting of OH, $NH_2$, and $C_1$-$C_8$ alkoxy groups; and wherein the colorant contains less than or equal to about 1.0 weight percent of an impurity represented by general formula (II):

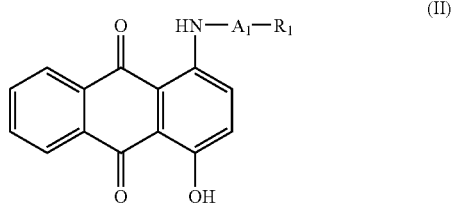

wherein $A_1$ and $R_1$ are as defined above in general formula (I), and wherein the colorant contains less than or equal to about 1.0 weight percent of a water and alcohol insoluble black impurity.

The inventive N,N'-dialkyleneoxy-substituted 1,4-diaminoanthraquinone colorants are preferably water soluble. More specifically, the colorants are preferably water soluble at concentrations which provide sufficient coloration for a desired end-use application. Furthermore, the N,N'-dialkyleneoxy-substituted 1,4-diaminoanthraquinone colorants of the present invention are preferably water fugitive (i.e. washable from substrates with water) on all kinds of substrates, such as, for example, human skin, textile substrates, coated surfaces (such as, for example, painted surfaces), ceramic surfaces, etc. Also, the inventive N,N'-dialkyleneoxy-substituted 1,4-diaminoanthraquinone colorants are generally liquid or semi-solid at ambient conditions. "Semi-solid" generally means the colorant is a highly viscous liquid, or may even be paste-like, and its melting temperature, if it has any, is typically below about 60° C.

The N,N'-dialkyleneoxy-substituted 1,4-diaminoanthraquinone colorants may be synthesized from 1,4-dihydroxyanthraquinone (i.e. quinizarin), 2,3-dihydro-9,10-dihydroxy-1,4-anthracenedione (i.e. leucoquinizarin), or from a mixture of the two components with suitable amines as illustrated by the following reaction:

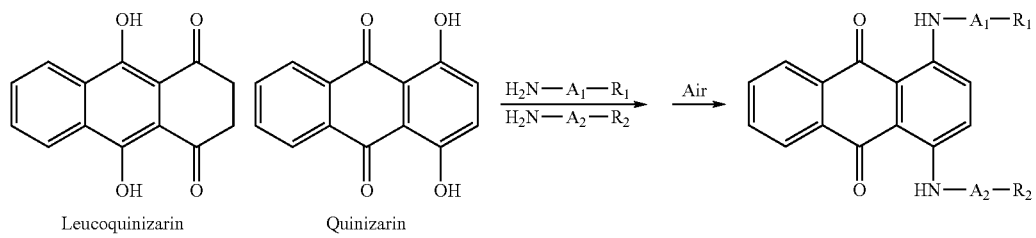

Leucoquinizarin    Quinizarin

For several reasons, when 1,4-dihydroxyanthraquinone is used as the starting material, it is generally preferable to use a mixture of quinizarin and leucoquinizarin. First of all, the reaction between quinizarin and aliphatic primary amines is typically slow, and it is often difficult to get the reaction to go to completion. The reaction also tends to generate an undesirable level of impurities. Furthermore, leucoquinizarin is more expensive than quinizarin, and the formed leuco products need to be oxidized in order to create the final product. Thus, it is typically not economical to use leucoquinizarin alone. While leucoquinizarin can be produced from quinizarin by reduction with reducing agents (such as zinc, hydrosulfite salts, etc.), this extra reduction reaction generally increases the impurities in the final product, and purification, such as by filtering out these impurities, is difficult. Accordingly, it is generally preferable to use a mixture of quinizarin and leucoquinizarin. More specifically, it is preferable that the molar ratio of quinizarin to leucoquinizarin in a mixture of leucoquinizarin and quinizarin is preferably from about 1 to about 5, and more preferably, the ratio is about 1 to 3.

Many polyalkyleneoxy-substituted amines, or mixtures of amines, may be used to react with a mixture of leucoquinizarin and quinizarin to form the anthraquinone colorants of the present invention. It is desirable that the amines are primary amines. Preferably, the polyalkyleneoxy-substituted amine is predominantly comprised of a polyethyleneoxy-substituted amine, which tends to provide good water solubility. However, the amine may also be a polyethyleneoxy-polypropyleneoxy-substituted amine. It may be desirable that the amount of polyalkyleneoxy-substituted amines added to the reaction mixture is between about 100% and about 120% of the required stoichiometric amount and, preferably, between about 100% and about 110% of the required stoichiometric amount.

There are many commercially available polyalkyleneoxy-substituted amines which can be used for this invention. For example, the polyoxyalkylene amines include Jeffamine® amines (available from Huntsman Chemical Company of Austin, Tex.) can be used, which include monoamines like M-600, M-100, M-2005 and M-2070; and diamines. Examples of amines having hydroxyl groups include diethylene glycol amine and 3-aminopropyl diethylene glycol (which is available from Dixie Chemical Company under the trade name DCA 163). Further examples include polyalkyleneoxy-substituted diamines such as bis(hydroxyalkyl)diamines (including APDEA and APDIPA from Tomah Products, Inc.).

Another series of glycol ether primary amines from Tomah include PA-EGM, PA-EGB, PA-EGH, PA-DEGM, PA-DEGB, PA-PGM, PA-PGB, PA-DPGM and PA-DPGB. Another series of di-primary amines from Tomah include DPA-DEG, DPA-200E, DPA-400E, DPA-1000E, and NDPA-10.

The inventive N,N'-dialkyleneoxy-substituted 1,4-diaminoanthraquinone colorants are generally synthesized according to the procedure described below. However, the rate of the reaction may be affected, for example, by the temperature, the amine, and the agitation rate employed. The progress of the reaction can be monitored by visible spectroscopy and/or High Performance Liquid Chromatography (HPLC).

A mixture of quinizarin and leucoquinizarin may be added to a polyalkyleneoxy-substituted amine in a reaction flask equipped with an agitator, temperature controller, and condenser under inert atmosphere. The reaction mixture is then heated to a temperature between about 65° C. and about 120° C., and preferably to a temperature between about 75° C. and about 95° C., under an inert atmosphere. It is typically found that the reaction rate is too slow at lower temperatures. However, at higher temperatures, greater amounts of impurities are generally produced.

The condensation reaction usually is completed at the reaction temperature between about one and about twenty hours. Once the condensation reaction is finished, several methods can be employed to oxidize the product in its leuco form to 1,4-diaminoanthraquinone. One method that may be used to oxidize the product is to bubble air through the reaction mixture at a temperature of between about 60° C. and about 100° C. and, preferably between about 75° C. and about 95° C. Other methods of oxidation may be used, such as oxidation by peroxides, heating in nitrobenzene, or oxidation by other weak organic oxidants. However, in most cases, these oxidation methods are not as clean and as economical as the air oxidation method.

One of the impurities formed during this reaction, which is represented by general formula (II), is 1-aminoalkyleneoxy-substituted 4-hydroxy anthraquinone. This impurity is generally bright violet in shade and has visible absorption peaks at approximately 550 nm and 590 nm in methanol. When this impurity is present in the final product at levels greater than about 1%, it typically affects the brightness of the colorant and its washability from substrates, such as fabrics. It was discovered that this impurity may be controlled to a level of less than about 1.0% by controlling the reaction conditions used to make the anthraquinone colorants. More specifically, the anthraquinone colorant may be synthesized using a process that does not require the use of solvents, such as water binding polar solvents, including glycerol, ethylene glycol, propylene glycol, polyols, etc. Under these anhydrous, or nearly anhydrous conditions, this violet impurity may be reduced to a minimum level (i.e. <1.0%), which typically has no significant effect on the performance of the anthraquinone colorants.

Another impurity present in the inventive anthraquinone colorants, which is present in substantially reduced amounts, is a water and methanol insoluble black solid. Usually, the insoluble black solid is comprised of very fine particles, which can stain fabrics and is often difficult to remove by filtration, thereby causing process problems. For example, over time, some of the impurity tends to settle out in processing lines and in the bottom of drum containers forming an undesirable sludge-like build-up. The impurity also tends to plug filters using in purifying the colorant. Thus, it is highly desirable to eliminate or reduce this impurity formed during the manufacture of the anthraquinone colorants. It has been found that when the reaction is controlled as described herein, such as without the use of solvents, the insoluble black solid impurity may be reduced to less than about 1.0% by weight.

Additionally, the anthraquinone colorants of the present invention generally possess many other desirable and advantageous properties for use in various consumer products. The colorants generally have good alkali fastness. They can typically be used in high pH formulations, such as wherein the pH is between about 8 and about 13, without having stability problems. Such pH ranges are often found in powder detergents, heavy-duty liquid detergents, hard surface cleaners, etc. Additionally, these anthraquinone colorants may exhibit desirable color brightness due to fluorescence of the anthraquinone chromophore. As such, these anthraquinone colorants may be used to color various personal care, home care, and fabric care products. For example, the colorants may be used to color soap bars, liquid soaps, fabric softeners, car washing formulations, glass cleaners, toilet cleaners, shampoos, and the like. Examples of specific laundry detergent formulations (both granular and liquid), which may be suitable for use with the anthraquinone of the present invention, are disclosed in commonly assigned U.S. Pat. No. 5,770,552 to Bruhnke. Examples of specific fabric softener formulations, which may be suitable for use with the anthraquinone of the present invention, are disclosed in U.S. Pat. No. 5,770,557 to Bruhnke.

The anthraquinone colorants can also be used in industrial formulations, such as heavy-duty industrial cleaners and detergents and fertilizers. Additionally, it is contemplated that the colorants of the current invention may be ideal for use in coloring thermoplastic materials (such as, for example, polyolefin and polyester) and thermoset materials (such as, for example, polyurethane foam). Examples of specific thermoplastic formulations, which may be suitable for use with the anthraquinone of the present invention, are disclosed in U.S. Pat. Nos. 4,640,690; 4,732,570; and 4,812,141 to Baumgartner et al.

Examples of specific thermoset formulations, which may be suitable for use with the anthraquinone of the present invention, are disclosed in commonly assigned U.S. Pat. Nos. 4,284,729 to Cross et al. and U.S. Pat. No. 4,846,846 to Rekers et al. In general, polyurethane foam is produced through the catalyzed polymerization of the reaction products of polyols and isocyanates. Blowing agents present within the polymerization step typically provide the necessary foam-making capability. Such a reaction is well known throughout the polyurethane industry and has been practiced for many years.

It is also contemplated to be within the scope of this invention that a large variety of colors and shades may be obtained by blending the inventive anthraquinone colorant with one or more additional water soluble colorants. Blending of the colorants may be readily accomplished, for example, when combining colorants having substantially identical solubility characteristics. One exemplary class of colorants includes the Reactint® colorants (available from Milliken Chemical of Spartanburg, S.C.). The Reactint® colorants are generally water soluble, or dispersible, at room temperature and may be suitably blended with the anthraquinone colorant of the present invention to achieve improved colors and shades.

EXAMPLES

The following examples are provided for illustration purposes and should not be considered as limiting the scope of the invention.

All color values and absorbance values were measured using a Beckman DU 650 spectrophotometer. Generally, the higher the color value, the stronger the colorant. The violet impurity, represented by general formula (II), was measured by HPLC analysis on a Waters™Alliance 2695 Chromatography System employing a Waters™ 996 photodiode array detector. All values and percentages are provided based on 100 percent solids, unless otherwise indicated.

The water and methanol insoluble black impurity was measured using the following method: Approximately 10 grams of blue colorant was diluted to about 5% by weight with water. The mixture was then stirred for about 15 minutes, and the pH was adjusted to about <5.0 with concentrated hydrochloric acid. The mixture was stirred for another 15 minutes and filtered through a pre-weighed one-micron size filter. The solid black impurity was washed with methanol until the liquid passing through the filter was substantially colorless. The solid impurity and filter were allowed to air dry for about 15 minutes and then were dried in a 100° C. oven for about 30 minutes. The dried filter and impurity were weighed and the percentage of insoluble impurity was calculated.

Example 1

To a 1 L glass reaction vessel equipped with a mechanical stirrer, temperature probe, water-cooled condenser, and a gas inlet tube was added 2-[2-(3-aminopropoxy)ethoxy]ethanol (291 g), leucoquinizarin (52 g), and quinizarin (152 g). The reaction mixture was heated under a nitrogen atmosphere to 70° C., at which time agitation was started. The reaction mixture was then heated to 80° C. After heating at that temperature for 4 hours, a gentle stream of air was introduced into the reaction mixture and heating at 80° C. was continued with the air sparge in order to oxidize the reaction mixture. After heating an additional 5 hours, the oxidation was complete. The reaction mixture was then cooled to room temperature to produce a blue anthraquinone colorant having a maximum absorbance at 639 nanometers and a color value of 31.5 (absorbance/g/L in methanol). The colorant contained 0.2% 1-(3-(2-(2-hydroxyethoxy)ethoxy)propylamino-4-hydroxy-anthraquinone (i.e. violet impurity) and 0.7% of water and methanol insoluble black impurity. The structure of the anthraquinone colorant is shown below:

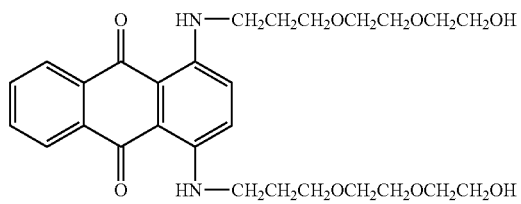

Comparative Example 1

This Comparative Example was prepared as generally described in commonly assigned U.S. Pat. No. 4,846,846 to Rekers et al.

To a 4-neck, 1 L reaction flask equipped with a mechanical agitator, thermometer, condenser, and nitrogen inlet was added water (172 g), quinizarin (69.08 g), leucoquinizarin (23.16 g), and 2-[2-(3-aminopropoxy)ethoxy]ethanol (137.38 g). The ensuing mixture was heated to 95° C. for 5 hours under a nitrogen atmosphere to give a blue mixture. The reaction mixture was then oxidized by bubbling air through the reaction mixture at 80° C. for 3 hours to give 398 g of a viscous blue liquid having 55.94% solids, color value (based on 55.94% solids) of 17.29 (abs/g/L in methanol) and a maximum absorbance at 639 nm. Based on 100% solids, the colorant contained 1.67% of 1-(3-(2-(2-hydroxyethoxy)ethoxy) propylamino-4-hydroxyanthraquinone (i.e. violet impurity) and 1.73% of water and methanol insoluble black impurity.

Thus, these results indicate that less impurity is produced when the anthraquinone colorant of the present invention is made without the use of any solvent, such as water. More specifically, less than about 1.0% of the violet impurity and of the water and methanol insoluble black impurity is produced.

Example 2

To a 3-neck 250 mL reaction flask equipped with an agitator, condenser and temperature controller was added 3-[2-(2-methoxyethoxy)ethoxy]propylamine (35.43 g), leucoquinizarin (4.84 g) and quinizarin (14.41 g) under nitrogen. The mixture was heated to 95° C. and stirred for 3 hours. Then a sample was taken and the UV-vis spectrum was check to make sure the reaction was completed. Then the reaction mixture was cooled to 80° C. and air was bubbled through the reaction mixture to oxidize the leuco-form product for 2 hours to provide 51.2 g of thick, dark blue colorant. The colorant had a color value of 22.07 (abs/g/L in methanol) and a maximum absorbance at 639 nm. The colorant contained 0.2% of 1-(3-(2-(2-methoxyethoxy)ethoxy)propylamino)-4-hydroxyanthraquinone (i.e. violet impurity) and 0.32% of water and methanol insoluble black impurity. The structure of the anthraquinone colorant is shown below:

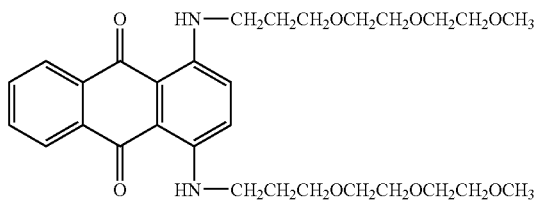

Comparative Example 2

To a 3-neck 250 mL reaction flask equipped with an agitator, condenser and temperature controller was added water (36.45 g), leucoquinizarin (4.84 g), quinizarin (14.41 g) and 3-[2-(2-methoxyethoxy)ethoxy]propylamine (35.43 9) under inert atmosphere. The reaction mixture was heated to 95° C. for 5 hours. The completion of the reaction was confirmed by visible absorbance of the reaction mixture at 592 nm and at 639 nm. Air was then bubbled through the mixture at 80° C. for 3 hours in order to oxidize the leuco product to s provide 77.17 g of a dark blue colorant. The colorant had a maximum absorbance at 639 nm and a color value of 14.29 (abs/L/g in methanol) with a solid content of 46.32%. The colorant contained 7.81% 1-(3-(2-(2-methoxyethoxy)ethoxy)propylamino)-4-hydroxyanthraquinone (i.e. violet impurity) and 4.68% of water and methanol insoluble black impurity.

These results indicate that less impurity is produced when the anthraquinone colorant of the present invention is made without the use of any solvent, such as water. More specifically, less than about 1.0% of the violet impurity and of the water and methanol insoluble black impurity is produced.

Example 3

To a 3-neck 500 mL round bottom flask equipped with a stir rod, thermometer, condenser, and nitrogen inlet was added quinizarin (43.1 g), leucoquinizarin (14.8 g) and 2,2'-[(3-aminopropyl)imino]diethanol (100.0 g). The ensuing mixture was heated to 90° C. for 4 hours under a nitrogen atmosphere to give a blue mixture. After 4 hours at 90° C., the reaction mixture was oxidized by bubbling air through the reaction mixture at 80° C. for 2 hours to give 120 g of a blue liquid with a color value of 30.0 (abs/g/L in methanol) and a maximum absorbance at 640 nm. The colorant contained 0.74% of 1-(3-(bis(2-hydroxyethyl)amino)propylamino-4-hydroxyanthraquinone (i.e. violet impurity) and 0.35% of water and methanol insoluble black impurity. The structure of the anthraquinone colorant is shown below:

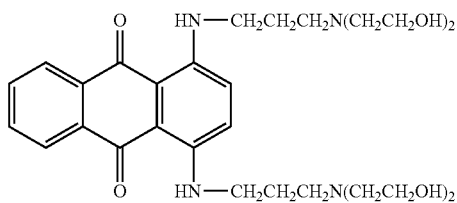

Comparative Example 3

To a 3-neck 500 mL round bottom flask equipped with a stir rod, thermometer, condenser, and nitrogen inlet was added water (62.7 g), quinizarin (43.1 g), leucoquinizarin (14.8 g) and 2,2'-[(3-aminopropyl)imino]diethanol (84.4 g). The ensuing mixture was heated to 90° C. for 4 hours under a nitrogen atmosphere to give a blue mixture. After 4 hours at 90° C., the reaction mixture was oxidized by bubbling air through the reaction mixture at 80° C. for 2 hours to give 160 g of a blue liquid with a color value of 20.4 (abs/g/L in methanol) and a maximum absorbance at 640 nm. The colorant contained 4.34% of 1-(3-(bis(2-hydroxyethyl)amino) propylamino-4-hydroxyanthraquinone (i.e. violet impurity) and 2.91% of water and methanol insoluble black impurity.

These results indicate that less impurity is produced when the anthraquinone colorant of the present invention is made without the use of any solvent, such as water. More specifically, less than about 1.0% of the violet impurity and of the water and methanol insoluble black impurity is produced.

Example 4

Colorant formulations used for consumer products, such as liquid and solid laundry detergents and fabric softeners, often employ an anthraquinone colorant in the formulation. In order to illustrate the reduction in staining of the inventive anthraquinone colorant over the prior art anthraquinone colorant, two colorant formulations were prepared. Colorant Formulation 1 was prepared with the inventive anthraquinone colorant made according to the process described in Example 1. Colorant Formulation 2 was prepared with a prior art anthraquinone made according to the process described in Comparative Example 1. Their tendency to stain cotton terry cloth fabric was evaluated as described below.

Colored zeolite adjunct containing 6% of the respective colorant formulation was incorporated onto white powder detergent at 2.5%. Each colorant formulation contained about 36% of the respective anthraquinone. The colored detergent (2.5 g) was sprinkled on three swatches of white terry cloth fabric on a plate. Fifty milliliters of water was slowly poured onto the plate and allowed to stand for 16 hours. The swatches were then rinsed in water and dried. The staining of the two formulations was compared to an unstained fabric sample and evaluated using the American Association of Textile Chemists and Colorists Gray Scale for Evaluating Staining. This Scale evaluates staining using a rating scale from 1 to 5, with higher numbers denoting less staining. The test results are shown in Table 1 below.

TABLE 1

Staining Comparison on Cotton Terry Cloth Fabric

| Formulation | Gray Scale Rating |
|---|---|
| Colorant Formulation 1 | 4.0 |
| Colorant Formulation 2 | 3.0 |

The test results indicate that there is less staining of the fabric when the inventive anthraquinone colorant, which is made by the inventive process described herein, is added to the colorant formulation. The test results also illustrate that the inventive anthraquinone is water fugitive, i.e. the colorant can be washed from the fabric with water.

Example 5

The novel process for synthesizing the anthraquinone colorant of the present invention results in the production of less violet impurity. This reduction in violet impurity results in a colorant having brighter color, typically, brighter blue color. In contrast, blue colorants having higher levels of the violet impurity, such as those made by prior art processes, appear to have more redness in the colorant. This is undesirable because the redness tends to dull the colorant, and the colorant appears less chromatic.

To illustrate this desirable feature of the inventive anthraquinone, a batch of the inventive anthraquinone colorant was synthesized as described in Example 1 above. For comparison, a batch of prior art anthraquinone colorant was synthesized as described in Comparative Example 1 above. The hue angle of the colorants was determined using a Gretag-MacBeth™ Color-Eye 7000A. Hue angle is typically a measure of the shade of a color. The test results show that the inventive anthraquinone colorant exhibited a hue angle of about 241.5°, while the prior art colorant exhibited a hue angle of about 244.3°. Thus, the prior art colorant exhibited more of a red shade, which is less desirable, when compared to the colorant of the present invention.

To further illustrate this effect, a batch of inventive anthraquinone colorant was intentionally doped with increasing amounts of the violet impurity. The effect on the hue angle is shown in Table 2 and in FIG. 1. The results illustrate that by increasing the amount of violet impurity present in the colorant, the colorant exhibits more of a red cast. As mentioned previously, this effect is undesirable because the desired blue shade is more dull and less chromatic than the colorant without the impurity.

TABLE 2

Effect of Violet Impurity on Hue Angle

| Percent Impurity | Hue Angle |
|---|---|
| 0.0 | 242.2 |
| 0.2 | 242.8 |
| 0.4 | 243.5 |
| 0.6 | 243.6 |
| 0.8 | 244.2 |
| 1.0 | 244.5 |

TABLE 2-continued

Effect of Violet Impurity on Hue Angle

| Percent Impurity | Hue Angle |
|---|---|
| 1.4 | 245.6 |
| 1.6 | 245.8 |

Example 6

A standard colored polyurethane foam article was made similar to the process disclosed in U.S. Pat. No. 4,846,846 to Rekers et al. The components employed in the foam formulation are as follows (php=parts per hundred parts polyol):

| Component | Amount |
|---|---|
| F3022 Polyol | 100 parts |
| Water | 4.53 php |
| DABCO TL (catalyst, available from Air Products) | 0.15 php |
| DABCO T10 (catalyst, available from Air Products) | 0.30 php |
| L520 Silicone (from Witco) | 1.0 php |
| 80/20 toluene diisocyanate* | 43.6 php |
| Colorant Blend | 1.0 php |

*The 80/20 toluene diisocyanate is a mixture of isomers containing 80% 2,4-toluene diisocyanate and 20% 2,6-toluene diisocyanate.

The Colorant Blend consisted of 0.2 php of the inventive anthraquinone colorant (made according to the procedure described in Example 1) and 0.8 php of a yellow colorant (Reactint® Yellow X15, available from Milliken Chemical of Spartanburg, S.C.).

The components above were combined and mixed together within a reaction vessel, the reaction created a "health" bubble (indicating gelation and blowing balance), and the vessel was then exposed to 185° C. (generated within a microwave oven to simulate actual heat history encountered on an industrial production level) for about 10 minutes. A polyurethane foam article was thus produced.

The foam article was then sliced in half and evaluated for color using a Hunter Ultrascan XE Spectrophotometer. The foam article exhibited a C* (chroma) of 45.54.

Comparative Example 6

A polyurethane foam article ("Foam 2") was produced according to the process described in Example 6 above, except that the Colorant Blend was modified. The Colorant Blend consisted of 0.2 php of blue colorant (made according to the procedure described in Comparative Example 1) and 0.8 php of yellow colorant (Reactint®) Yellow X15, available from Milliken Chemical of Spartanburg, S.C.).

The resultant foam article was sliced in half and evaluated for color using a Hunter Ultrascan XE Spectrophotometer. The foam article exhibited a C* (chroma) of 43.96.

The foam article of Example 6 exhibited a higher C* value than the foam article of Comparative Example 6. Thus, since higher C* values are characteristic of brighter colors, the test results illustrate that a brighter green color can be achieved by using the anthraquinone colorant of the present invention. These results further illustrate that the inventive anthraquinone colorant may be successfully combined with other water soluble colorants to achieve a variety of shades and colors.

Thus, it has been illustrated that the inventive anthraquinone colorant made without the use of solvents or purification results in lower levels of impurities. As mentioned previously, reduced impurity levels are desirable because they exhibit less staining on substrates, such as fabric substrates. The reduced impurity levels are also advantageous since it has been shown that high impurity levels result in a colorant having a red cast, which makes the blue anthraquinone colorant dull and less chromatic. When combining the anthraquinone colorant with other colorants, brighter colors and shades can be achieved. Accordingly, the anthraquinone colorant of the present invention may be incorporated into various personal care, home care, and fabric care products (such as, for example, liquid and solid laundry detergents and liquid fabric softeners) as well as into thermoplastic materials and thermoset materials (such as polyurethane foam articles).

These and other modifications and variations to the present invention may be practiced by those of ordinary skill in the art, without departing from the spirit and scope of the present invention. Furthermore, those of ordinary skill in the art will appreciate that the foregoing description is by way of example only, and is not intended to limit the scope of the invention described in the appended claims.

We claim:
1. A colorant comprising:
a) a compound having formula (I):

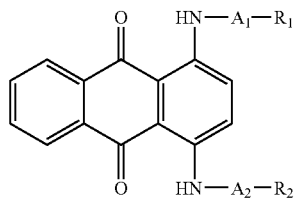

wherein $A_1$ and $A_2$ are, independently of each other, polyethyleneoxy-, polypropyleneoxy-, or polyethyleneoxy-/polypropyleneoxy-copolymers; wherein the number of repeating polyethyleneoxy-, and/or polypropyleneoxy-units is less than or equal to 25; or
wherein $A_1$ and $A_2$ are, independently of each other, $-CH_2CH_2CH_2M[(CH_2CH_2O)_xCH_2CH_2-]_y-$;
wherein M can be either O or N and x=0-5, and if M is O, then y=1 and if M is N then y=2; and
wherein $R_1$ and $R_2$ represent the terminal group of the polyalkyleneoxy chain and are, independently of each other, selected from the group consisting of OH, $NH_2$, and $C_1-C_8$ alkoxy groups;
b) an impurity having formula (II):

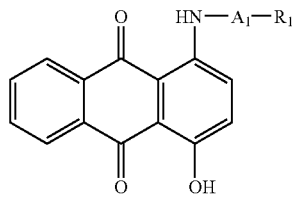

wherein $A_1$ and $R_1$ are as defined above in formula (I), and wherein the impurity is present in an amount that is less than about 1.0% by weight; and
c) a water and methanol insoluble black impurity, wherein the impurity is present in an amount that is less than about 1.0% by weight.

2. The colorant of claim 1, wherein the colorant is N,N'-dialkyleneoxy-substituted 1,4-diaminoanthraquinone.

3. The colorant of claim 1, wherein the colorant is water soluble.

4. The colorant of claim 1, wherein the colorant is water fugitive.

5. The colorant of claim 1, wherein the impurity having formula (II) is 1-aminoalkyleneoxy-substituted 4-hydroxy anthraquinone.

6. The colorant of claim 5, wherein the impurity having formula (II) is 1-(3-(2-(2-hydroxyethoxy)ethoxy)propylamino-4-hydroxyanthraquinone.

7. The colorant of claim 5, wherein the impurity having formula (II) is 1-(3-(2-(2-methoxyethoxy)ethoxy)propylamino)-4-hydroxyanthraquinone.

8. The colorant of claim 5, wherein the impurity having formula (II) is 1-(3-(bis(2-hydroxyethyl)amino)propylamino-4-hydroxyanthraquinone.

9. The colorant of claim 1, wherein the colorant exhibits a hue angle between about 242.0 and about 244.5.

10. The colorant of claim 1, wherein the colorant is blended with at least one additional water soluble colorant.

11. The colorant of claim 1, wherein the colorant is incorporated into a liquid laundry detergent.

12. The colorant of claim 1, wherein the colorant is incorporated into a granular laundry detergent.

13. The colorant of claim 1, wherein the colorant is incorporated into a liquid fabric softener.

14. The colorant of claim 1, wherein the colorant is incorporated into a thermoset material.

15. The colorant of claim 14, wherein the colorant is incorporated into a polyurethane foam article.

16. The colorant of claim 1, wherein the colorant is incorporated into a thermoplastic material.

17. A process for making a colorant comprising the following steps:
a) combining 2,3-dihydro-9,10-dihydroxy-1,4-anthracenedione; 1,4-dihydroxyanthraquinone; and a polyalkyleneoxy-substituted amine into a mixture;
b) initiating a condensation reaction of the mixture by agitating and heating the mixture to form a condensation product; and
c) oxidizing the condensation product to form an N,N'-dialkyleneoxy-substituted 1,4-diaminoanthraquinone colorant, wherein the colorant contains less than about 1.0% of a violet impurity and less than about 1.0% of a water and methanol insoluble black impurity; and wherein the process is performed without the use of solvents.

18. The process of claim 17, wherein the condensation reaction of step (b) occurs in an inert atmosphere.

19. The process of claim 17, wherein the molar ratio of 1,4-dihydroxyanthraquinone to 2,3-dihydro-9,10-dihydroxy-1,4-anthracenedione is from about 1 to about 5.

20. The process of claim 19, wherein the molar ratio of 1,4-dihydroxyanthraquinone to 2,3-dihydro-9,10-dihydroxy-1,4-anthracenedione is from about 1 to about 3.

21. The process of claim 17, wherein the polyalkyleneoxy-substituted amine of step (a) is a polyethyleneoxy-substituted amine.

22. The process of claim 17, wherein the polyalkyleneoxy-substituted amine of step (a) is a polyethyleneoxy-polypropyleneoxy-substituted amine.

23. The process of claim 17, wherein the polyalkyleneoxy-substituted amine of step (a) is selected from the group consisting of diethylene glycol amines, aminopropyl diethylene glycol amines, polyalkyleneoxy-substituted diamines, and glycol ether primary amines.

24. The process of claim 17, wherein the polyalkyleneoxy-substituted amine is added to the mixture in an amount between about 100% and about 120% of the required stoichiometric amount.

25. The process of claim 24, wherein the polyalkyleneoxy-substituted amine is added to the mixture in an amount between about 100% and about 110% of the required stoichiometric amount.

26. The process of claim 17, wherein the condensation reaction of step (b) is carried out at a temperature between about 65° C. and about 120° C.

27. The process of claim 26, wherein the condensation reaction of step (b) is carried out at a temperature between about 75° C. and about 95° C.

28. The process of claim 17, wherein the condensation reaction of step (b) is carried out between about 1 and about 20 hours.

29. The process of claim 17, wherein the oxidation of step (c) is achieved by bubbling air through the reaction mixture at a temperature of between about 60° C. and about 100° C.

30. The process of claim 29, wherein the oxidation of step (c) is achieved at a temperature of between about 75° C. and about 95° C.

31. The product of the process of claim 17.

* * * * *